United States Patent
Stantchev

(10) Patent No.: US 10,180,832 B2
(45) Date of Patent: Jan. 15, 2019

(54) APPLICATION MATCHING METHOD FOR MOBILE DEVICE AND ACCESSORY METHOD

(71) Applicant: George Stantchev, Phoenix, AZ (US)

(72) Inventor: George Stantchev, Phoenix, AZ (US)

(*) Notice: Subject to any disclaimer, the term of this patent is extended or adjusted under 35 U.S.C. 154(b) by 0 days.

(21) Appl. No.: 14/940,341

(22) Filed: Nov. 13, 2015

(65) Prior Publication Data

US 2016/0139905 A1 May 19, 2016

Related U.S. Application Data

(60) Provisional application No. 62/079,928, filed on Nov. 14, 2014.

(51) Int. Cl.
*G06F 8/61* (2018.01)

(52) U.S. Cl.
CPC .................... *G06F 8/61* (2013.01)

(58) Field of Classification Search
CPC ........................................................ G06F 8/61
See application file for complete search history.

(56) References Cited

U.S. PATENT DOCUMENTS

| 9,031,762 B1* | 5/2015 | Bell ............. G06F 17/00 345/173 |
| 2002/0083430 A1* | 6/2002 | Kusuda ............. G06F 8/62 717/174 |
| 2014/0082610 A1* | 3/2014 | Wang ............. G06F 9/445 717/178 |
| 2014/0157387 A1* | 6/2014 | Lee ............. G06F 17/30309 726/7 |
| 2014/0277937 A1* | 9/2014 | Scholz ............. G06F 7/00 701/36 |
| 2015/0012913 A1* | 1/2015 | Jin ............. G06F 8/65 717/170 |
| 2015/0263860 A1* | 9/2015 | Leboeuf ............. H04L 9/3226 713/171 |

FOREIGN PATENT DOCUMENTS

| CN | 101710290 A | 5/2010 |
| CN | 102546779 A | 7/2012 |
| CN | 103365688 A | 10/2013 |

OTHER PUBLICATIONS

Google Chrome team, "Mirror Your Android Screen to the TV with Chromecast", Jul. 9, 2014, Chrome Blog.*

* cited by examiner

*Primary Examiner* — Li B. Zhen
*Assistant Examiner* — Amir Soltanzadeh
(74) *Attorney, Agent, or Firm* — Rosenberg, Klein & Lee

(57) ABSTRACT

This invention relates to an application matching method for a mobile device and an accessory device. The mobile device installs a plurality of applications. When the mobile device is connected to the accessory device, the accessory device can receive an application list from the mobile device. The application list should be a list of applications installed on the mobile device. Thus, the accessory device is able to install or reload part of or all applications installed on the mobile device according to the application list.

12 Claims, 9 Drawing Sheets

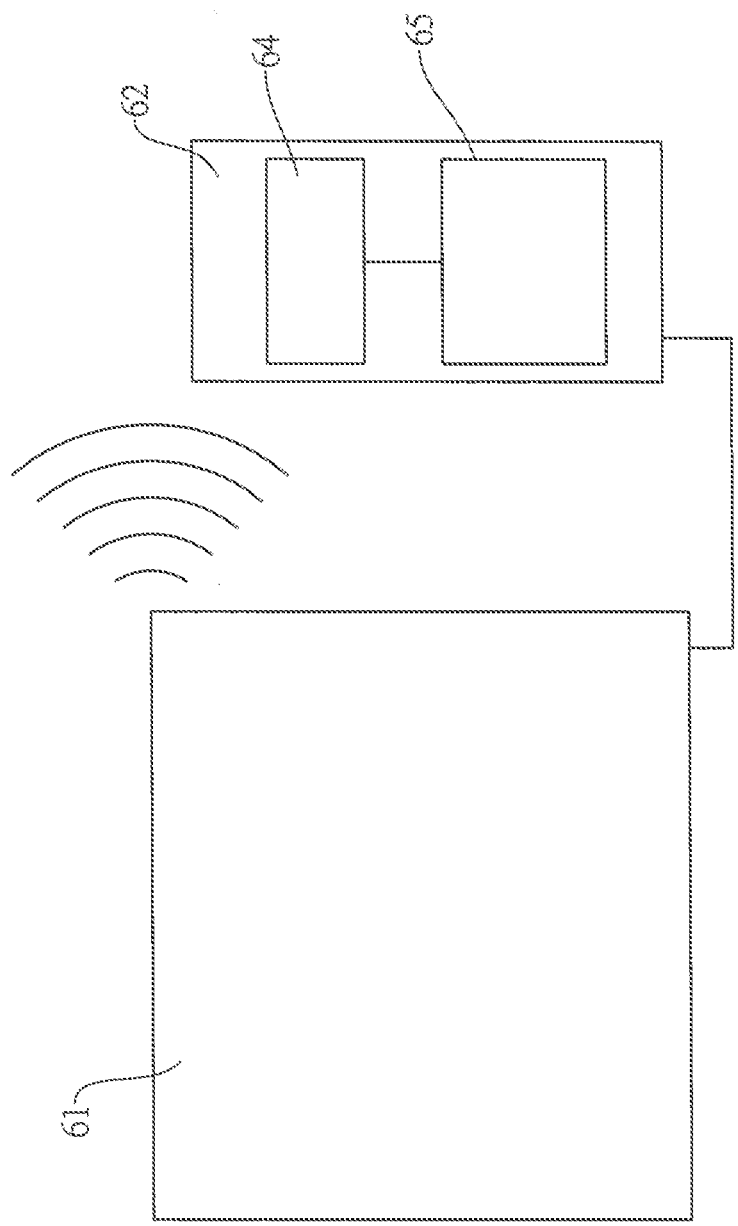

APPLICATION MATCHING METHOD FOR MOBILE DEVICE AND ACCESSORY METHOD

REFERENCE TO RELATED APPLICATION

This application is based on Provisional Patent Application Ser. No. 62/079,928, filed 14 Nov. 2014.

BACKGROUND OF THE INVENTION

1. Technical Field

This invention relates to an application matching method for a mobile device and an accessory device.

2. Description of the Prior Art

The popularity of mobile devices in the day-to-day life may cause safety issues when they are improperly used behind the wheel of a motor vehicle. Very often the attention of the driver has been drawn from a phone call or from the display of the mobile device rather than the road and this implicates local laws and the driver safety.

In the today's car a car head unit is integrated with many features including maps and phone call management but the advancement of the mobile device is always ahead than the vehicle electronics very often called infotainment technology. Even with those car head units incorporating the latest features the cell phone still will be a safety treat to the driver if improperly used.

The conventional car radios typically do not resolve successfully the convenience and safety concerns in today's car integrating the latest mobile device features as example including delivering traffic data, emergency calls, weather reports, music and content management, etc. Therefore, there is a need for a safe operation of a mobile device in a vehicle in a manner of controls that are embedded in the head unit display.

SUMMARY OF THE PRESENT INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is an object of the present invention to provide an application matching method for a mobile device and an accessory device. The invention is a method or a software routine that provides a seamless way to mirror a mobile device application environment into the accessory device or screen thereof by matching and mirroring the applications from the mobile device environment to the accessory device environment while the mobile device is not accessible or accessibility is permitted by law but connected safely by wired or wireless manner.

The accessory device may be a car head unit which is a self-contained electronic device. The car head unit may comprise a microprocessor, a memory and set of peripherals usually called a platform in order to respond to intended application in the car. The car head unit is running its own operation system and in many cases own application environment on the top of that platform. Further, the car head unit may have a screen attached or the screen can be installed remotely.

The mobile device may be a smart phone, a tablet PC, a computer or a laptop computer. The mobile device can be connected directly to the accessory device, such as the car head unit, and the accessory device can perform the functions of the mobile device by application matching.

The accessory device comprises a screen and an accessory unit, wherein the accessory unit is connected to the screen. The mobile device can be connected to the accessory unit that transfers the connection to the screen, and the screen and the accessory unit can perform the functions of the mobile device by application matching.

The application matching method is designed to be seamless to the user anticipating that the accessory device, such as the car head unit, does not have knowledge of the mobile device connected prior to the connection. When the mobile device is connected to the accessory device, the accessory device scans the installed applications on the mobile device and makes an application list of the installed applications, then compares the application list to the applications available or installed on the accessory device or at the online storage dedicated for that accessory device. This service provided by the accessory device we may call shortly AppMatch.

It is another object of the present invention to provide an application matching method for a mobile device and an accessory device. When there is a match from the application list to the available applications in the accessory device, those applications are relocated or installed on the accessory device. If the application is not matched, the accessory device may look for such application on a server, such as a web or cloud storage, and downloads it into the accessory device. If no such application is found in the server, the service may provide suggestions with similar applications.

It is very important to the driver that the car head unit or screen is seamlessly updated and personalized every time the mobile device is connected and if another mobile device is connected the car head unit it does not share personal information and the car head unit or screen being personalized for the other driver upon connecting as well. The application matching method requires that the personal information for each app is collected and transferred to each matched application so at the time a person opens that matched application it will open with the related personalized data as on the mobile device synchronized.

When the mobile device is disconnected from the accessory device, the accessory device will not retain any information from the previous mobile device and can be reconnected with another mobile device, from another person as example, with the same accessory device. This application matching method is driven by privacy concerns so the applications are matched for the time the connection to the currently synchronized mobile device exists.

The advantage of the invention is that by matching the mobile device application environment to the accessory device environment, the accessory device responds with sets of applications already adapted for the accessory device (car head unit) screen and interface type so the user interface is save for the driver to use while drives and provides the convenience in size and speed tailored to the integrated hardware in that vehicle.

An example for such interface is a map application that is available on the mobile device, although the same or similar maps on the accessory device are designed and scaled toward the vehicle screen and adapted as example to a resistive touch screen instead to the capacitive multi touch on the mobile device. With that scenario the maps will have zoom buttons and larger navigation buttons while on the mobile device those actions are performed by multi touch action.

Very often the accessory device scanning the mobile device may perform a general content synchronization function that will collect phone, music, navigation and other personal information. That personal information can be stored in secured space in the accessory device and retrieved when the corresponding mobile device is connected in order to save access time. If another mobile device is connected the applications will be matched and connected with another sync setting unless exclusively approved to share settings in between.

The app matching can be done by matching the application list of the mobile device with applications installed or stored in the accessory device at the time the mobile device is connected. If those applications are not found locally can be searched in the server, such as web, cloud or APP store, that is intended for use with that accessory device, i.e. the match can be done locally when the mob ile device is connected or remotely via authenticated online portal.

The application matching method is intended generally to the automotive and consumer fields where a device located in a car or in a home replicates a mobile device functionality when connected. The functionality of the mobile device is replicated by matching the cell phone applications in the device own environment.

This invention provides a way to keep the mobile device integrated to the head unit and improve safety increasing the driving experience.

To achieve these and other objects of the present invention, the present invention provides an application matching method for a mobile device and an accessory device, comprising steps of: installing one or a plurality of applications on said mobile device; connecting said mobile device with said accessory device; and installing part of or all applications that are installed by said mobile device on said accessory device.

Further, the present invention provides another application matching method for a mobile device, a server and an accessory device, comprising steps of: installing a plurality of applications on said mobile device; connecting said mobile device with said server; receiving an application list from said mobile device by said server, wherein said application list is a list of said applications installed on said mobile device; connecting said accessory device with said server; receiving said application list form said server by said accessory device; and installing part of or all applications according to said application list.

Other advantages and features of the present invention will be fully understood by reference to the following specification in conjunction with the accompanying drawings, in which like reference signs denote like components of structure.

BRIEF DESCRIPTION OF THE DRAWINGS

Many of the application match features will be more readily appreciated, as the same become better understood by reference to the following detailed description considered in connection with the accompanying drawings.

FIG. 6 is a block diagram of a mobile device and an accessory device in accordance with another embodiment of the present invention.

DETAILED DESCRIPTION OF THE PREFERRED EMBODIMENTS

Figure 1:
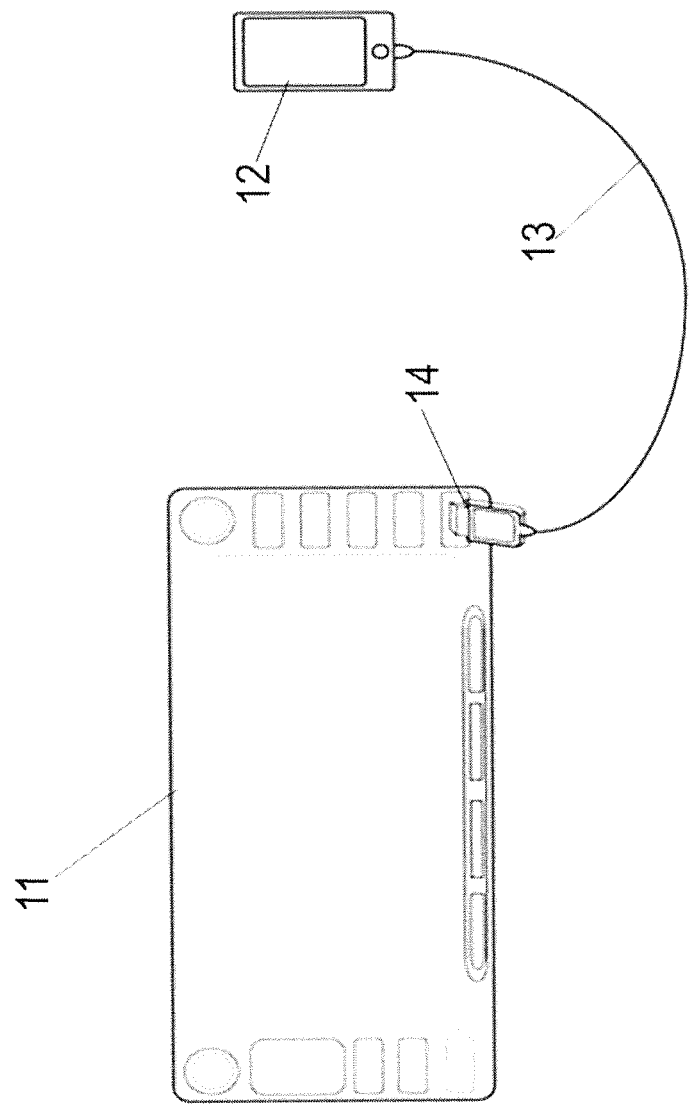
FIG. 1 is a connection diagram of a mobile device and an accessory device in accordance with an embodiment of the present invention.

Please refer to FIG. 1, a connection diagram of a mobile device and an accessory device in accordance with an embodiment of the present invention is shown. As illustrated, the accessory device 11, such as a car head unit, may comprise a connecting unit 14, such as an USB plug in a front panel of the accessory device 11. The mobile device 12, such as a smart phone, a tablet PC, a computer or a laptop computer, installs a plurality of applications and allows those applications to execute on its platform and controlled via a touch screen. The mobile device 12 is able to be connected to the connecting unit 14 via a connecting cable 13, such as an USB cable.

In the embodiment of the invention, when the mobile device 12 is connected to the accessory device 11 via the connecting cable 13, the accessory device 11 may execute an AppMatch service. The AppMatch service is executed on the accessory device 11 and may request an application list from the connected mobile device 12 via the connecting cable 13. The application list is a list of part of or all applications installed on the mobile device 12.

The accessory device 11 installs applications according to the received application list. Thus, the accessory device 11 installs part of or all applications currently installed on the mobile device 12 to build a similar selection of local applications installed in the accessory device 11.

Further, when the mobile device 12 is connected with the accessory device 11 next time, the accessory device 11 is able to reload part of or all applications installed thereon according to the application list.

In one embodiment of the invention, the mobile device 12 may comprise at least one personal information corresponding to applications thereon. For instance, the personal information may comprise phone number, music, account number, password, navigation and/or other information. The mobile device 12 is able to transmit the personal information to the accessory device 11, and the personal information can be encoded and/or stored in secured space of the accessory device 11 and retrieved when the corresponding mobile device 12 is connected in order to save access time.

The connection between the mobile device 12 and the accessory device 11 can be wired via the connecting cable 13 or wireless as example via Wi-Fi or Bluetooth. In case of wireless connection the mobile device 12 can be paired or part of the accessory device network or the accessory device 11 can be paired to the mobile device network as example a hotspot network. Either the accessory device 11 or the mobile device 12 can be a hotspot or a device in the wireless network above.

The AppMatch service of the accessory device 11 downloads the application list of the installed or generally available applications in the mobile device 12 and relocates or installs the available applications compatible to the operation system (OS) of the accessory device 11 in a such manner to personalize the accessory device 11 with all credentials necessary to execute the matched applications while the mobile device 12 is connected.

The connected mobile device 12 and accessory device 11 may have same or similar applications after the matching method. Thus, when a user operates an application on the mobile device 12, the mobile device 12 may transmit a control signal to the accessory device 11, and the accessory device 11 may also execute same operation with the mobile device 12. Thereafter, the user is able to remote control the accessory device 11 via the connected mobile device 12. For instance, when the user executes a navigation application on the mobile device 12, the mobile device 12 may transmit the control signal to the accessory device 11, and the accessory device 11 executes same or relative navigation application. When the user sets a destination on the navigation application of the mobile device 12, the mobile device 12 will transmit the destination information to the connected accessory device 11. Thus, the destination information is set on the navigation application of the accessory device 11.

Figure 2:
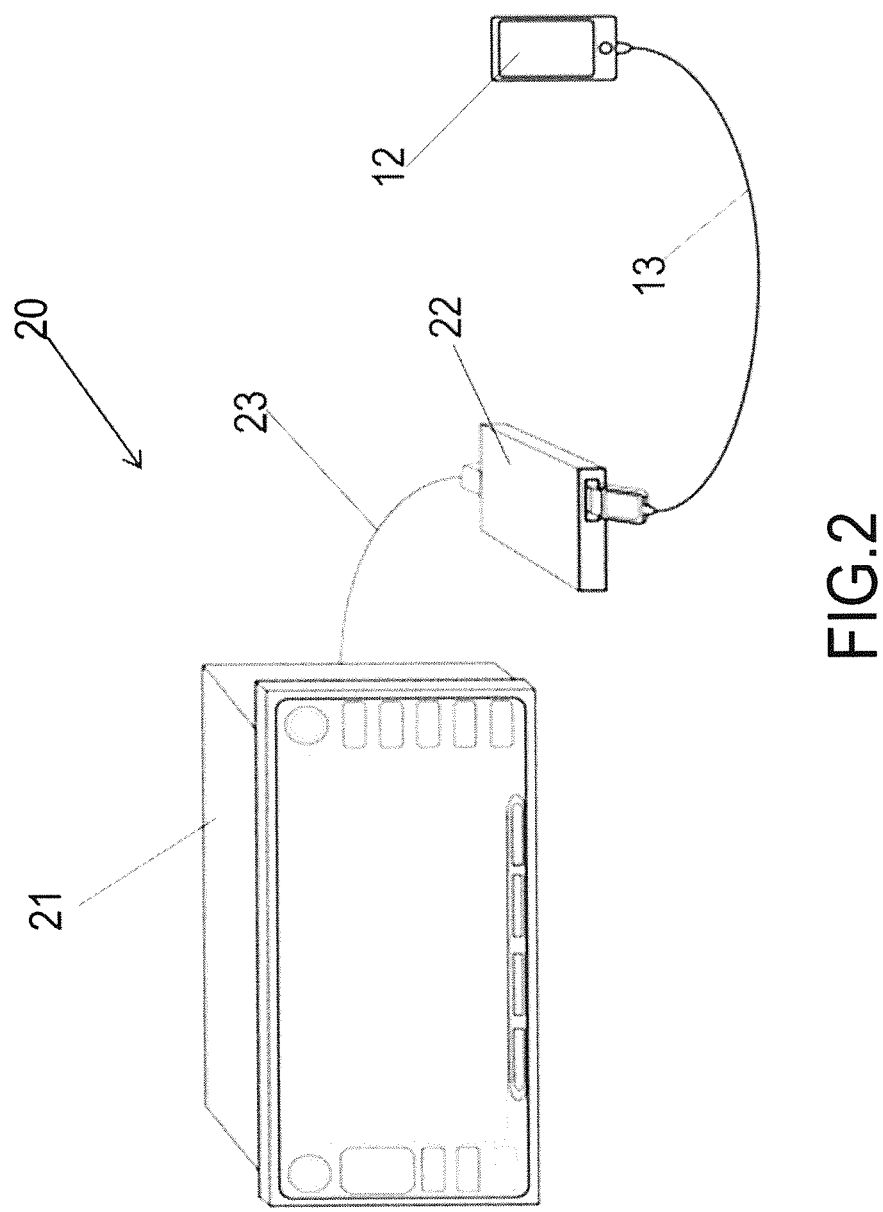
FIG. 2 is a connection diagram of a mobile device and an accessory device in accordance with another embodiment of the present invention.

Please refer to FIG. 2, a connection diagram of a mobile device and an accessory device in accordance with another embodiment of the present invention is shown. As illustrated, the accessory device 20 comprises a screen 21 and an accessory unit 22, wherein the accessory unit 22 is connected to the screen 21 via a transmission line 23. Further, the mobile device 12 is able to be connected to the accessory unit 22 via a connecting cable 13.

In the embodiment of the invention, when the mobile device 12 is connected to the accessory unit 22 via the connecting cable 13, the accessory unit 22 may execute an AppMatch service. The AppMatch service is executed on the accessory device 22 and may request an application list from the connected mobile device 12 via the connecting cable 13. Then, the accessory unit 22 is able to install applications currently installed on the mobile device 12 base on the received application list to build a similar selection of local applications installed in the accessory unit 22. The screen 21 is able to display icons of the applications installed on the accessory unit 22.

Further, when the mobile device 12 is connected with the accessory device 20 next time, the accessory device 20 is able to reload part of or all applications installed thereon according to the application list.

In other embodiment of the invention, the connection between the mobile device 12 and the accessory device 20 can be wired via the connecting cable 13 or wireless as example via Wi-Fi or Bluetooth.

Figure 3:
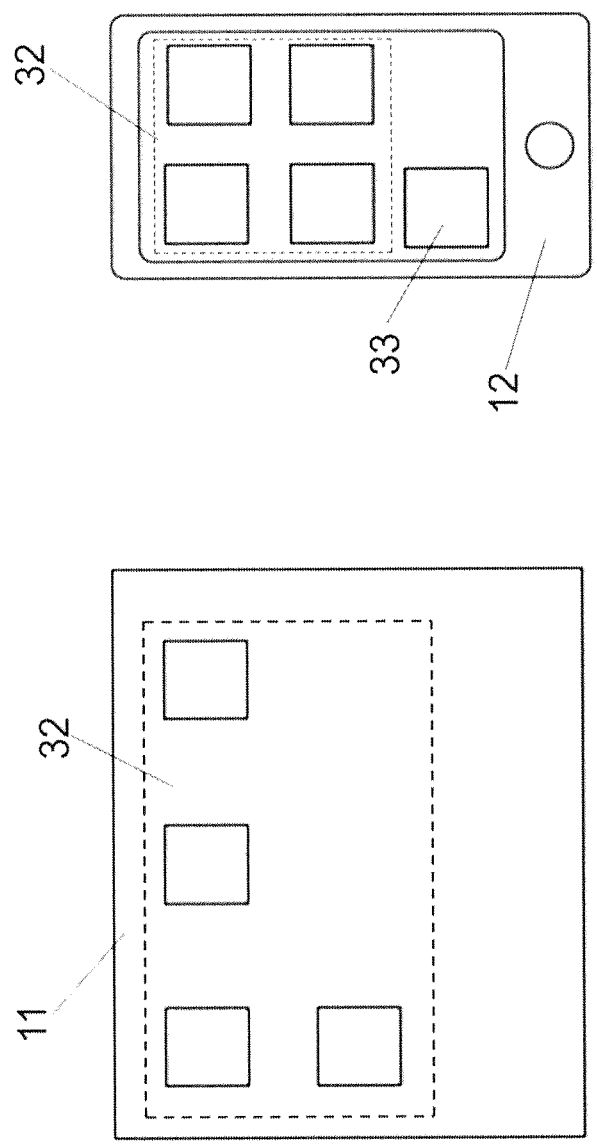
FIG. 3 is a block diagram of a mobile device and an accessory device in accordance with an embodiment of the present invention.

Please refer to FIG. 3, a block diagram of a mobile device and an accessory device in accordance with an embodiment of the present invention is shown. As illustrated, the mobile device 12 comprises or installs a plurality of applications, and those applications may be distinguished a first group application 32 and a second group application 33. The first group application 32 and the second group application 33 may comprise one or a plurality of applications.

When the mobile device 12 is connected to the accessory device 11, the accessory device 11 may execute an AppMatch service. The connection between the mobile device 12 and the accessory device 11 can be wired or wireless. The AppMatch service is executed on the accessory device 11 and requests an application list from the mobile device 12.

In this embodiment of the invention, the application list may comprise part of applications. For instance, the application list comprises first group application 32. Thus, the accessory device 11 only installs first group application 32, and the second group application 33 is not installed or presented on the accessory device 11.

Not every application may be matched as usually, if the OS of the mobile device 12 is different from the accessory device 11, and there is no guarantee that the application from the OS of the mobile device 12 will have equivalent in the OS of the accessory device 11. Another reason for not matching every application from the mobile device 12 to the accessory device 11, such as the car head unit, can be its inappropriate content for a driver seat or in car use.

The AppMatch service can be programmed to filter only allowed application for mirroring or to suggest better applications with an appropriate content approved by the car manufacturer or the authorities in charge.

Figure 4:
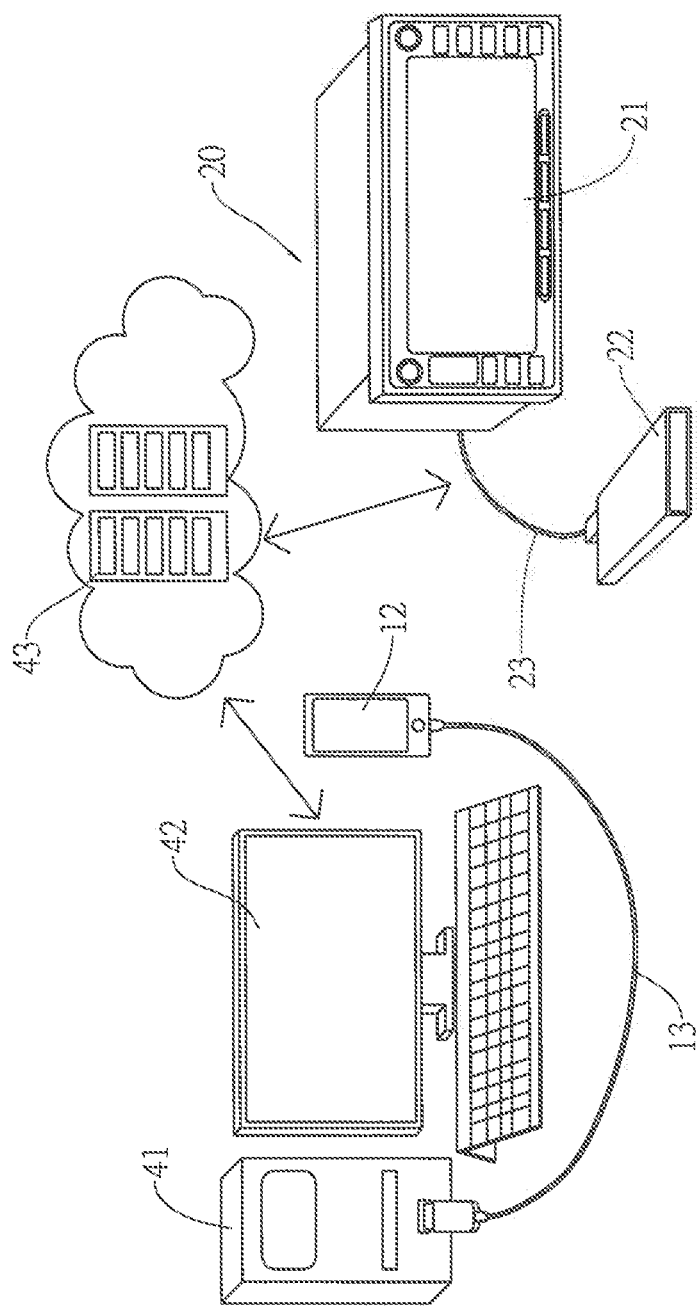
FIG. 4 is a connection diagram of a mobile device, an accessory device and a server in accordance with an embodiment of the present invention.

Please refer to FIG. 4, a connection diagram of a mobile device, an accessory device and a server in accordance with an embodiment of the present invention is shown. As illustrated, the mobile device 12 is connected to a computer 41 with a monitor 42 via a connecting cable 13, such as an USB cable. Further, the accessory device 20 is connected to a server 43, such as a web or a cloud service, via the computer 41. The server 43 may execute the AppMatch service to request an application list from the mobile device 12. Then the accessory device 20 is able to request the application list of the mobile device 12 from the server 43, and installs applications according to the application list.

In other embodiment of the invention, the mobile device 12 may transmit the application list to the server 43 directly without passing the computer 41. Further, the accessory device 20 may comprise a screen 21 and an accessory unit 22, and the screen 21 is connected to the accessory unit 22 via a transmission line 23.

The number of the accessory device 20 may be more than one, and those accessory devices 20 are able to acquire the application list of the mobile device 12 from the server 43, and install applications according to the application list.

Figure 5:
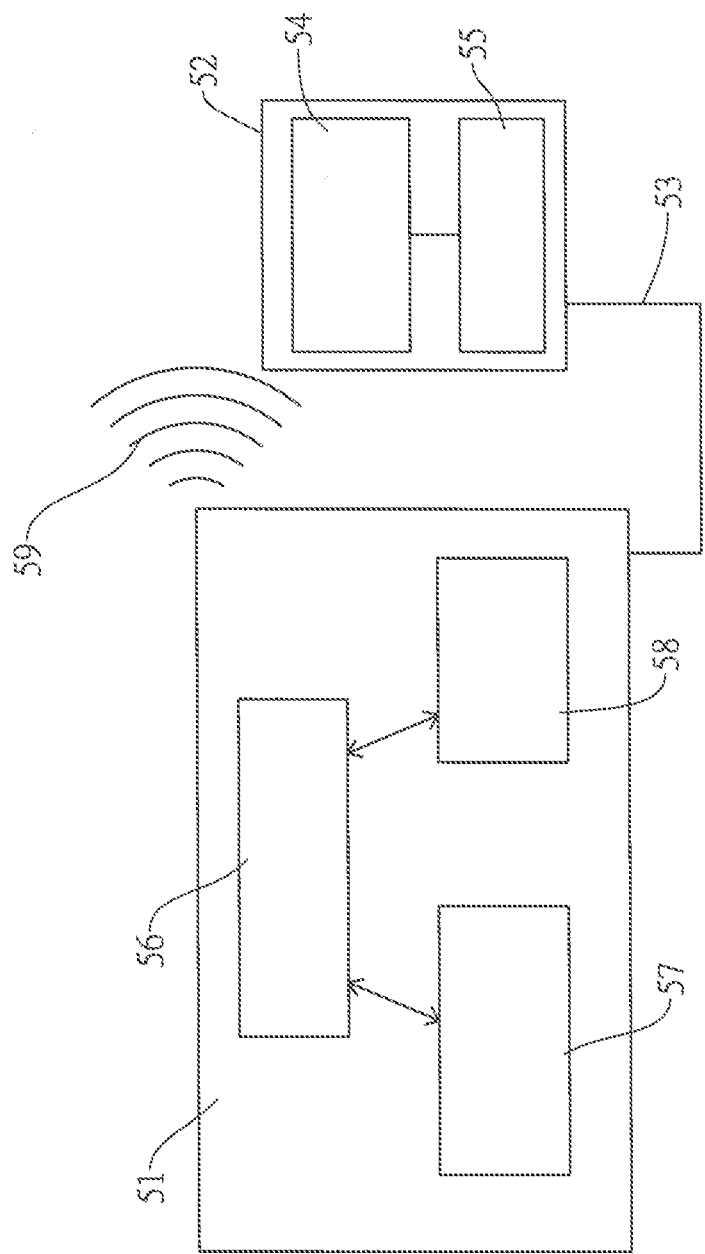
FIG. 5 is a block diagram of a mobile device and an accessory device in accordance with another embodiment of the present invention.

Please refer to FIG. 5, a block diagram of a mobile device and an accessory device in accordance with another embodiment of the present invention is shown. As illustrated, the mobile device 52 comprises a synchronization service 54 and a plurality of applications 55, and the accessory device 51 comprises a plurality of application 57 and a home application 56.

The accessory device 51 is connected to the mobile device 52 via a wired connection 53 or a wireless connection 59. The mobile device 52 executes the synchronization service 54 accessing all applications 55 installed thereon, and the accessory device 51 executes the home application 56 to compare applications 57 thereon and applications 55 on the mobile device 52. Further, the accessory device 51 reloads part or all applications 57 according to comparative result to generate at least one relocated application 58 as a separate folder.

Please refer to FIG. 6, a block diagram of a mobile device and an accessory device in accordance with another embodiment of the present invention is shown. As illustrated, the accessory device 61 mirrors part of or all applications of the mobile device 62 while the mobile device 62 is connected to the accessory device 61. The accessory device 61 comprises a synchronization service 64, such as AppMatch collecting a list of available applications 65 of the mobile device 62 and matching applications in the accessory device 61. Further, when the accessory device 61 is not connected to the mobile device 62, the accessory device 61, such as car head unit, is completely blank except it dedicated car functionality.

Figure 7A:
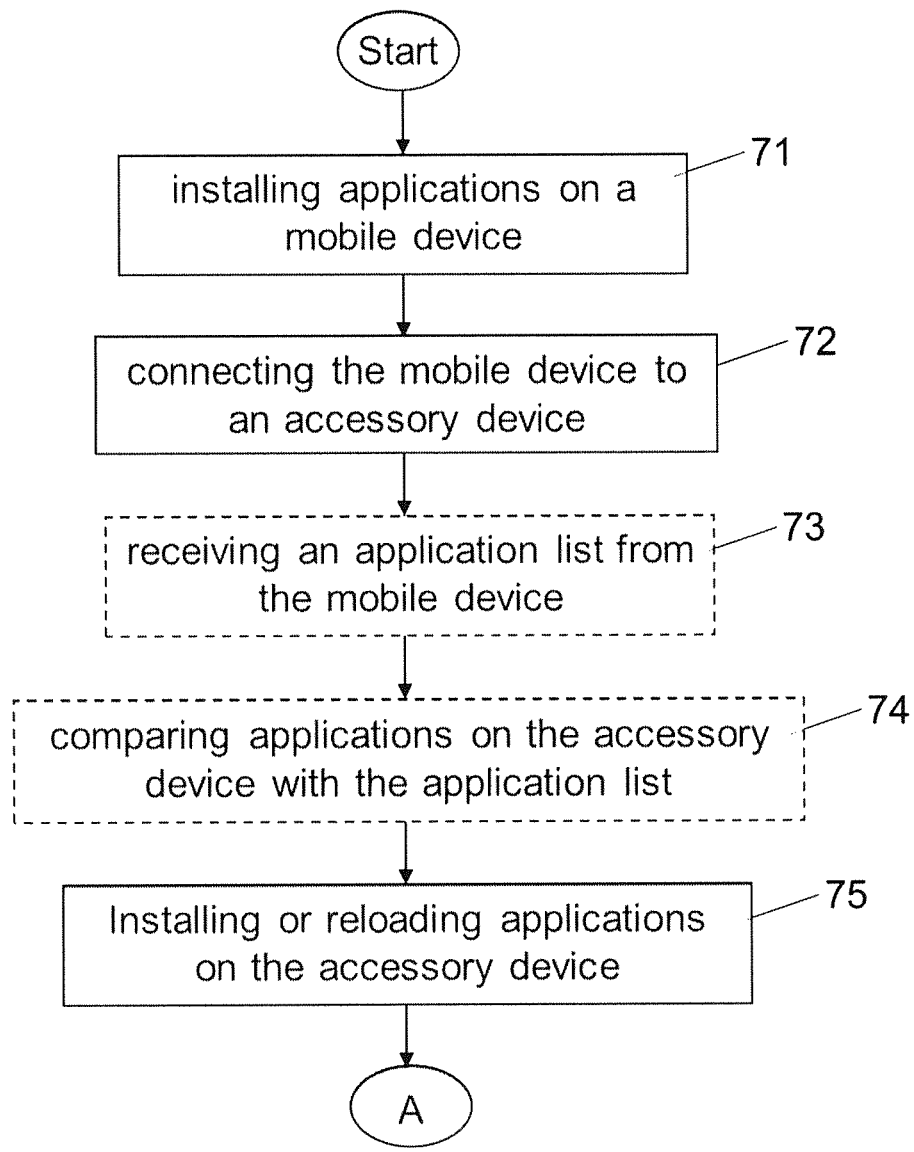
FIGS. 7A and 7B are flow charts of an application matching method for a mobile device and an accessory device in accordance with an embodiment of the present invention is shown.
Figure 7B:
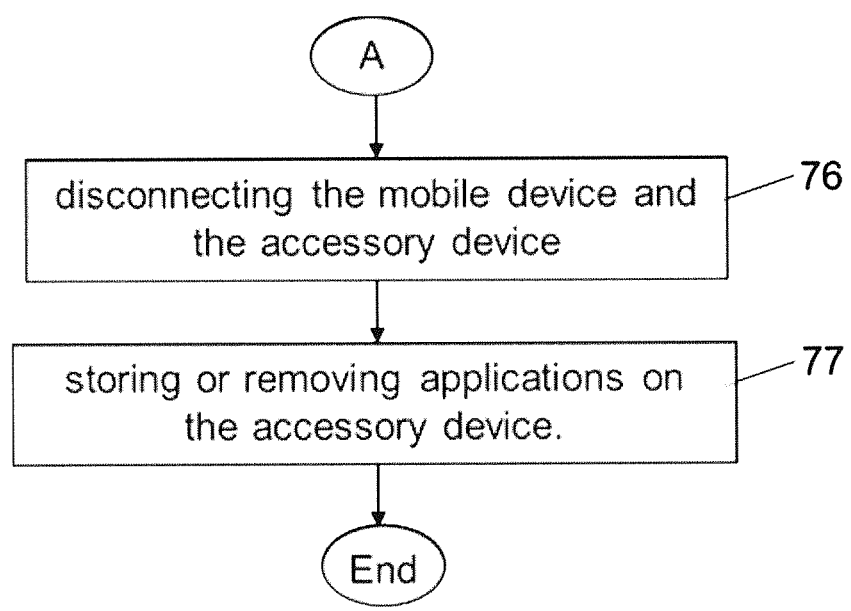

Please refer to FIGS. 7A and 7B, flow charts of an application matching method for a mobile device and an accessory device in accordance with an embodiment of the present invention are shown. Referring also to FIG. 1, the mobile device 12 installs a plurality of applications, as step 71. The mobile device 12 is connected to the accessory device 11 via wired connection or wireless connection, as step 72. The accessory device 11 will install or reload part of or all applications installed on the mobile device 12 and step 75.

In one embodiment of the invention, the accessory device 11 may receive an application list from the mobile device 12, as the accessory device 11 is connected with the mobile device 12, as step 73. The application list is a list of applications installed on the mobile device 12. Then, the accessory device 11 is able to install or reload applications according to the received application list to build a similar selection of local applications installed in the accessory device 11.

In one embodiment of the invention, the accessory device 11 may compare the application list with applications that have been installed on the accessory device 11, as step 74. The accessory device 11 is able to reload applications thereon according to the comparative result of the application list and applications installed on the accessory device 11. Further, the accessory device 11 may also install new applications according the comparative result or the application list.

The mobile device 12 is disconnected from the accessory device 11, as step 76. Then, the accessory device 11 stores or removes application thereof, as step 77.

Figure 8:
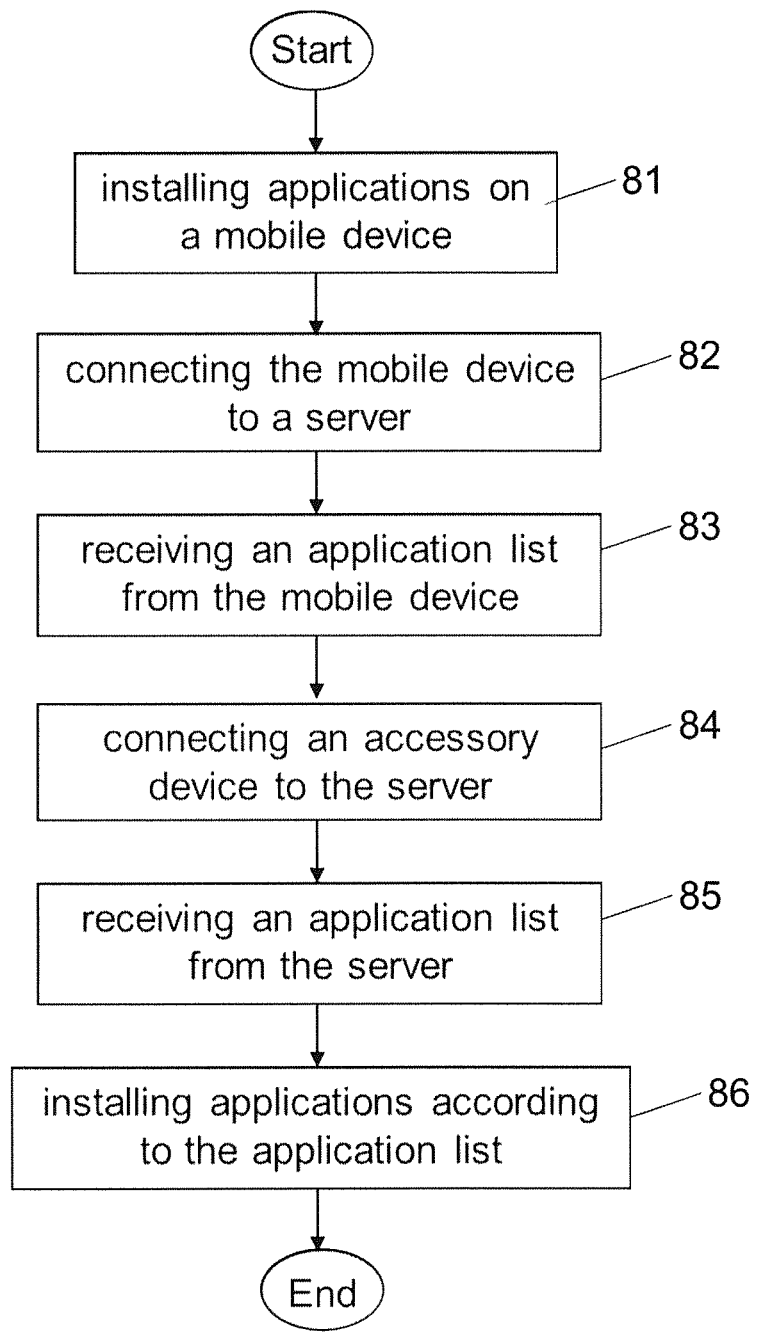
FIG. 8 is a flow chart of an application matching method for a mobile device, an accessory device and a server in accordance with an embodiment of the present invention.

Please refer to FIG. 8, a flow chart of an application matching method for a mobile device and an accessory device in accordance with another embodiment of the present invention is shown. Referring also to FIG. 4, the mobile device 12 installs a plurality of applications, as step 81. The mobile device 12 is connected to a server 43 via wireless communication or a computer 41, as step 82.

The server 43 receives an application list from the mobile device 12, wherein the application list is a list of all or part of applications installed on the mobile device 12, as step 83. The accessory device 20 is connected to the server 43, as step 84. Then, the accessory device 20 receives the application list from the server 43, and installs or reloads applications according to the received application list to build a similar selection of local applications installed in the accessory device 20, as step 85 and step 86.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An application matching method for a mobile device and a car head unit, comprising steps of:
    establishing one or more car head unit applications on said car head unit generating an car head unit a car head unit applications list;
    installing one or a plurality of mobile device applications on said mobile device generating a mobile device applications list;
    connecting said mobile device with said car head unit;
    transmitting said mobile device applications list to said car head unit, wherein said mobile device applications list is a list of said mobile device applications installed on said mobile device;
    comparing said mobile device applications list with said car head unit applications list for generating a comparison difference list;
    comparing an OS of said mobile device and an OS of said car head unit; and
    determining said OS of said mobile device being different from said OS of said car head unit, and downloading a similar car head unit application on said car head unit from said APP store,
    determining said OS of said mobile device being same from said OS of said car head unit,
    downloading corresponding applications to said car head unit from an APP store applications which are on said comparison difference list, said car head unit applications and said mobile device applications being operationally independent;
    installing or reloading part of or all applications from said downloaded corresponding applications on said comparison difference list on said car head unit, wherein, when said mobile device application or said car head unit application receives an operation instruction, said mobile device correspondingly transmits a control signal to said car head unit and said car head unit correspondingly transmits said control signal to said mobile device, whereby said car head unit and said mobile device are operationally synchronized and operate in parallel for operating a device specific application on said car head unit and said mobile device simultaneously, whereby a user of the car head unit operationally controls the car head unit or a user of the mobile device operationally controls the mobile device for mutual operation of both of the mobile device application and the car head unit application;
    disconnecting said mobile device and said car head unit;
    and removing part of or all said applications of said comparison difference list installed on said car head unit.

2. The application matching method as claimed in claim 1, wherein said car head unit comprises an accessory unit and a screen, and said mobile device is connected to said accessory unit.

3. The application matching method as claimed in claim 1, wherein said mobile device is connected to said car head unit via a wired connection or a wireless connection.

4. The application matching method as claimed in claim 1, further comprising the step of:
    transmitting at least one personal information from said mobile device to said car head unit.

5. The application matching method as claimed in claim 4, further comprising the step of:
    encoding and storing said personal information on said car head unit.

6. The application matching method as claimed in claim 1, wherein said mobile device applications installed on said mobile device comprises a first application group and a second application group, and said car head unit installs or reloads said first application group.

7. An application matching method for a mobile device, a server and a car head unit, and said mobile device, said server and said car head unit being three different devices, comprising steps of:
- establishing one or more car head unit applications on said car head unit generating an car head unit applications list;
- installing a plurality of mobile device applications on said mobile device generating a mobile device applications list;
- connecting said mobile device with said server;
- transmitting said mobile device applications list to said server, wherein said mobile device applications list is a list of said mobile device applications installed on said mobile device;
- connecting said car head unit with said server;
- transmitting said mobile device applications list from said server to said car head unit;
- comparing said mobile device applications list with said car head unit applications list for generating a comparison difference list;
- comparing an OS of said mobile device and an OS of said car head unit; and
- determining said OS of said mobile device being different from said OS of said car head unit, and
- downloading a similar accessory device car head unit application on said car head unit from said APP store,
- determining said OS of said mobile device being same from said OS of said car head unit,
- downloading corresponding applications to said car head unit from an APP store applications which are on said comparison difference list, said car head unit applications and said mobile device applications being operationally independent; and
- installing or reloading part of or all applications from said downloaded corresponding applications on said comparison difference list on said car head unit, wherein, when said mobile device application or said car head unit application receives an operation instruction, said mobile device correspondingly transmits a control signal to said car head unit and said car head unit correspondingly transmits said control signal to said mobile device, whereby said car head unit and said mobile device are operationally synchronized and operate in parallel for operating a device specific application on said car head unit and said mobile device simultaneously, whereby a user of the car head unit operationally controls the car head unit or a user of the mobile device operationally controls the mobile device for mutual operation of both of the mobile device application and the car head unit application.

8. The application matching method as claimed in claim 7, wherein said car head unit comprises an accessory unit and a screen, and said mobile device is connected to said accessory unit.

9. The application matching method as claimed in claim 7, wherein said mobile device is connected to said server via a computer.

10. The application matching method as claimed in claim 7, wherein said mobile device applications installed on said mobile device comprises a first application group and a second application group, and said car head unit installs or reloads said first application group.

11. The application matching method as claimed in claim 7, further comprising steps of:
- transmitting at least one personal information from said mobile device to said server; and
- transmitting said personal information from said server to said car head unit.

12. The application matching method as claimed in claim 11, further comprising the step of:
- encoding and storing said personal information on said server or said car head unit.

* * * * *